United States Patent [19]

Seckinger et al.

[11] 3,967,415
[45] July 6, 1976

[54] DEVICE FOR MOUNTING AND DISMOUNTING A GRINDING WHEEL ASSEMBLY ONTO OR FROM, RESPECTIVELY, THE GRINDING SPINDLE OF A GRINDING MACHINE

[75] Inventors: Ernst Seckinger, Zurich; Emil Vogelsanger, Dietlikon; Robert Wirthlin, Effretikon, all of Switzerland

[73] Assignee: Reishauer AG, Switzerland

[22] Filed: Sept. 11, 1974

[21] Appl. No.: 505,056

[30] Foreign Application Priority Data
Sept. 17, 1973 Switzerland.............. 13302/73

[52] U.S. Cl. ............................................. 51/168
[51] Int. Cl.² ....................................... B24B 41/00
[58] Field of Search .......... 51/166 TS, 166 T, 168, 51/262 R, 165.87; 29/568; 214/330

[56] References Cited
UNITED STATES PATENTS

| 2,695,482 | 11/1934 | Polster | 51/262 R |
|---|---|---|---|
| 2,707,855 | 5/1955 | Miller | 51/166 T |
| 2,804,727 | 9/1957 | Schmidt | 51/166 R |
| 3,491,427 | 1/1970 | Zimmerman | 214/330 |
| 3,526,033 | 9/1970 | Saunders | 29/568 |
| 3,627,490 | 12/1971 | Asano | 51/165.87 |
| 3,789,472 | 2/1974 | Pegard | 29/568 |

*Primary Examiner*—Al Lawrence Smith
*Assistant Examiner*—Robert C. Watson
*Attorney, Agent, or Firm*—Hill, Gross, Simpson, Van Santen, Steadman, Chiara & Simpson

[57] ABSTRACT

A device slidably mounted on the carriage of a grinding machine and having a pivotally mounted member thereon adapted to support a grinding wheel assembly and used to remove the grinding wheel assembly from the grinding spindle or replace a grinding wheel assembly onto the grinding machine spindle in such a manner that damage to the grinding wheel assembly is prevented.

4 Claims, 4 Drawing Figures

DEVICE FOR MOUNTING AND DISMOUNTING A GRINDING WHEEL ASSEMBLY ONTO OR FROM, RESPECTIVELY, THE GRINDING SPINDLE OF A GRINDING MACHINE

This invention relates to an apparatus for use on grinding machines by which a grinding wheel assembly may be mounted on or removed from, respectively, one end of the grinding spindle.

In the past the grinding wheel assembly was mounted or removed to or from the grinding spindle either by hand or with the assistance of an auxiliary means such, for example, as a block and tackle arrangement.

In mounting a grinding wheel assembly on the end of a grinding spindle, which is in most cases accessible only with difficulty, frequently impact occurred as a result of undesired and uncontrollable movements between the grinding wheel assembly and the end of the grinding spindle. This was true whether the change of the grinding wheel assembly was undertaken manually or while utilizing an auxiliary means. Because of this the fitting surfaces of the end of the spindle and/or the mating surfaces on the grinding wheel assembly were often damaged. Even the slightest damage produced an imbalance which resulted in a swinging and/or wobbling of the grinding wheel assembly and, consequently, adversely affected the rotation and/or the plane of travel of the grinding wheel.

Accordingly, it has become desirable to devise a means whereby the above disadvantages may be overcome. The object of this invention, therefore, is to provide a means by which the grinding tool may be mounted onto or removed from the spindle in a position correlated geometrically with the end of the grinding spindle, that is, without the necessity of tilting upon the end of the spindle in order to avoid damage thereto. In this manner, damage to the fitting surfaces on the end of the grinding spindle may be prevented and, thereby, accurate rotation and plane travel of the grinding tool are assured.

In summary, the object of this invention is attained by providing a carrier for receiving the grinding tool, the carrier being slidably guided in a longitudinal direction parallel to the axis of the grinding spindle and the carrier being provided with a support member which is swingable by means of a pivotal movement into its operating position and out of the same into its position of rest.

Other objects and advantages of this invention will become more apparent when the following description is considered in connection with the following drawings.

Figure 1:
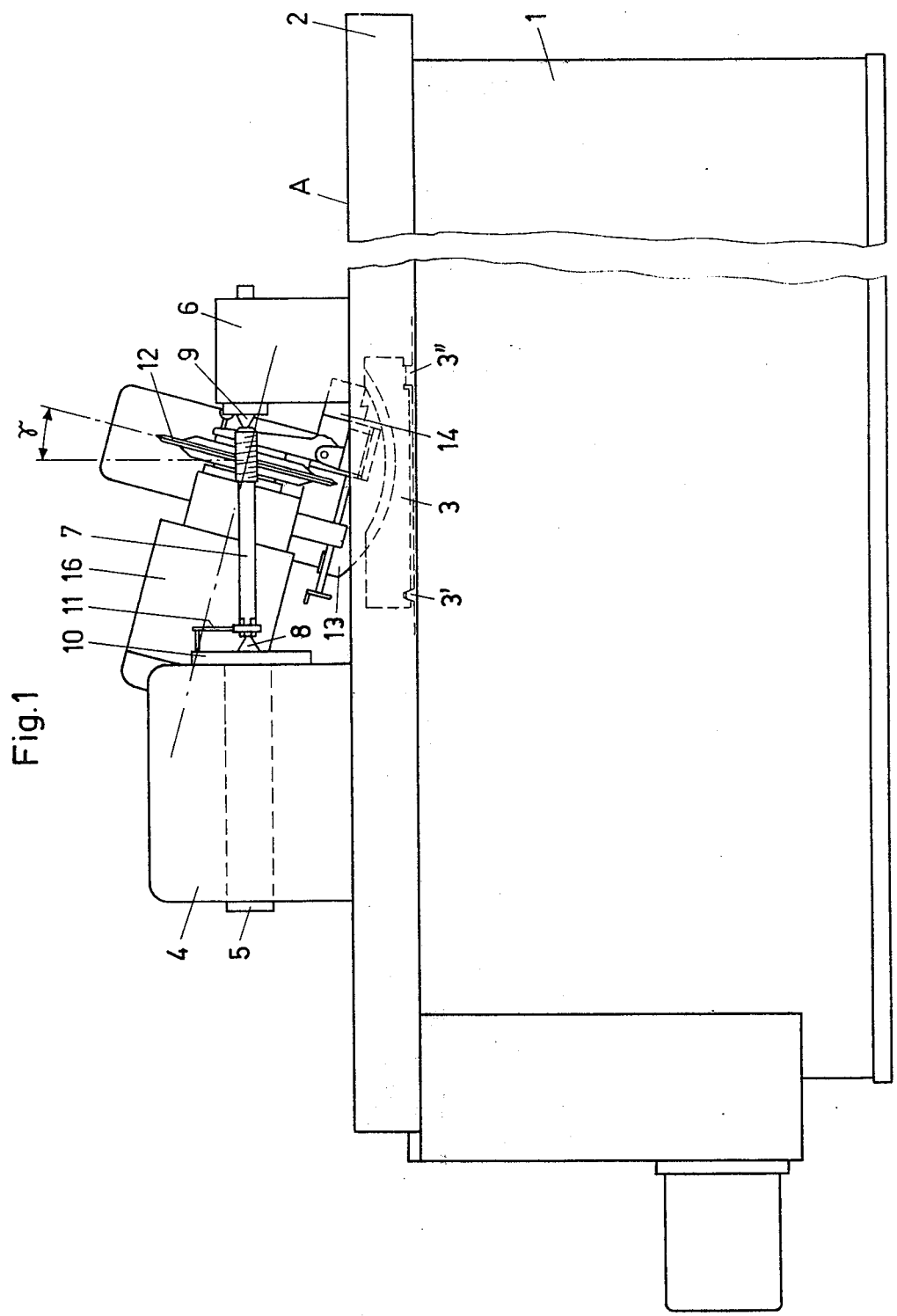
FIG. 1 is a view in elevation of a thread-grinding machine.

The thread-grinding machine shown in the drawing is known per se and, therefore, will be described only briefly to the extent necessary for understanding the grinding disk exchange device. The thread-grinding machine includes a table or bed 1 on which is guidingly supported the work-piece carriage 2 which is movable longitudinally and a grinding carriage 3 movable transversely of the table or bed 1 on guide members 3' and 3''. On the work-piece carriage 2 is fastened the work-piece spindle box 4 in which the work-piece spindle 5 is rotatably positioned. On the table surface A of the work-piece carriage 2, a tailstock 6 is slidably disposed. The work-piece 7 is clamped in the normal manner between the centering tips 8 and 9 and is rotated by the actuator disk 10 which is connected through a lathe dog 11 or through another actuator device. The drive and the shifting device of the work-piece carriage 2 and the grinding carriage 3, the drive of the grinding disk 12 as well as other elements of the thread-grinding machine not having any bearing on the device of the invention, are not shown in any detail as they are generally known.

A swingable cradle 13 which carries the grinding support 14 is disposed in a circular arcuate guide 13' (see FIGS. 2 and 4) on the grinding carriage 3. The grinding spindle 15 is rotatably positioned in the grinding support 14 and is driven by the motor 16. On the end B of the spindle 15 opposite the motor 16 is seated the grinding tool or grinding wheel assembly which consists of a flange body 17, a flange cover 18, and the grinding disk or wheel 12 clamped therebetween by means of the screws 19. The grinding wheel assembly is fixed with screws 20 (FIG. 2) to the grinding spindle 15 by means of the swingable cradle 13. The grinding disk 12, or the grinding support 14, respectively, may be adjusted so as to be positioned at a predetermined angle $\gamma$ (FIG. 1) with reference to the axis of the work-piece 7, such for example as at the pitch angle of the thread to be ground on the work-piece 7. With the aid of the clamping screw 21 (FIGS. 2, 4), the cradle 13 is fixed in the desired position.

The previously described parts of the thread-grinding machine are well known to one skilled in the art so that a further detailed description is not necessary. This invention relates to a grinding wheel changing device used on the grinding machine for removal and mounting of the grinding disk as hereinafter described.

On the grinding wheel support 14 or on the bracket E connected with it a guide path D is disposed and is arranged parallel to the axis of the grinding spindle 15, said guide path carrying the carriage 22. The latter may be moved back and forth with the aid of a threaded spindle 23. The threaded spindle 23 itself is held axially and positioned rotatably in a bracket H (FIGS. 2 and 4) which also is connected to the grinding support 14. A hand wheel 24 serves to rotate the threaded spindle 23. Thus, by actuation of the latter, the carriage 22 may be moved back and forth in the guide member D.

On the carriage 22 there is positioned a carrier 25 (FIGS. 2, 3, and 4) having a support member 25' pivotable about an axis 26. The pivotal movement is accomplished by manipulation with the hand lever 29. On the outer end of the carrier 25 a plate 27 is carried by the support member 25' and the plate 27 is provided with a centering pin C. The diameter of the centering pin corresponds exactly with the diameter of the cylindrical bore F in the flange body 17. In the plate 27 two passage holes K are located which lie opposite corresponding thread holes I in the flange body 17 and are positioned in registry therewith. In addition, there are present in the plate 47 four passage holes L which lie opposite the four screws 20 in the flange body 17. These serve as recesses for insertion and withdrawal of the screws 20 during assembly and disassembly of the grinding wheel assembly.

Figure 2:
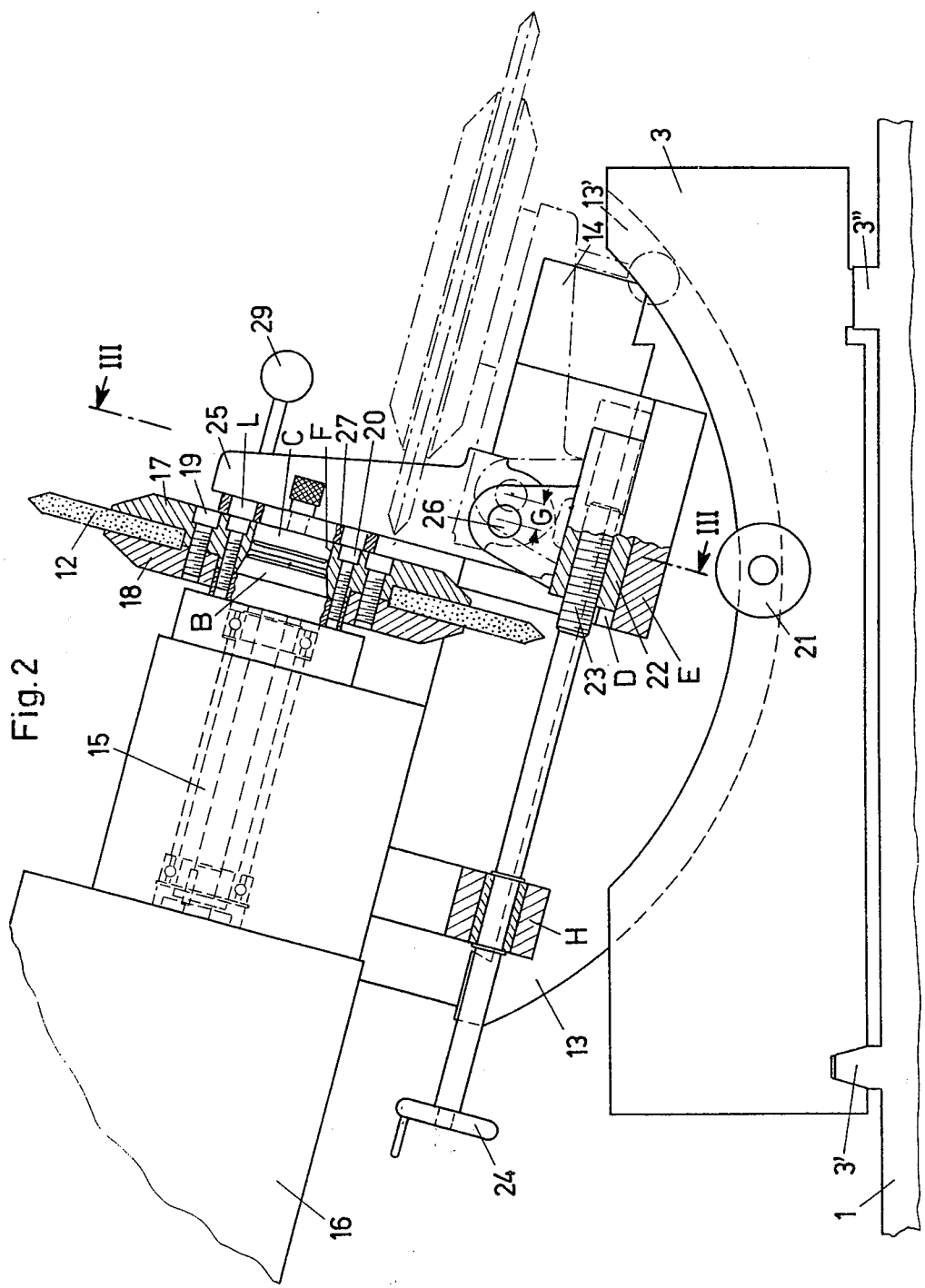
FIG. 2 is a view in elevation of a portion of the thread-grinding machine of FIG. 1 including a grinding wheel changing device shown partially in section.
Figure 3:
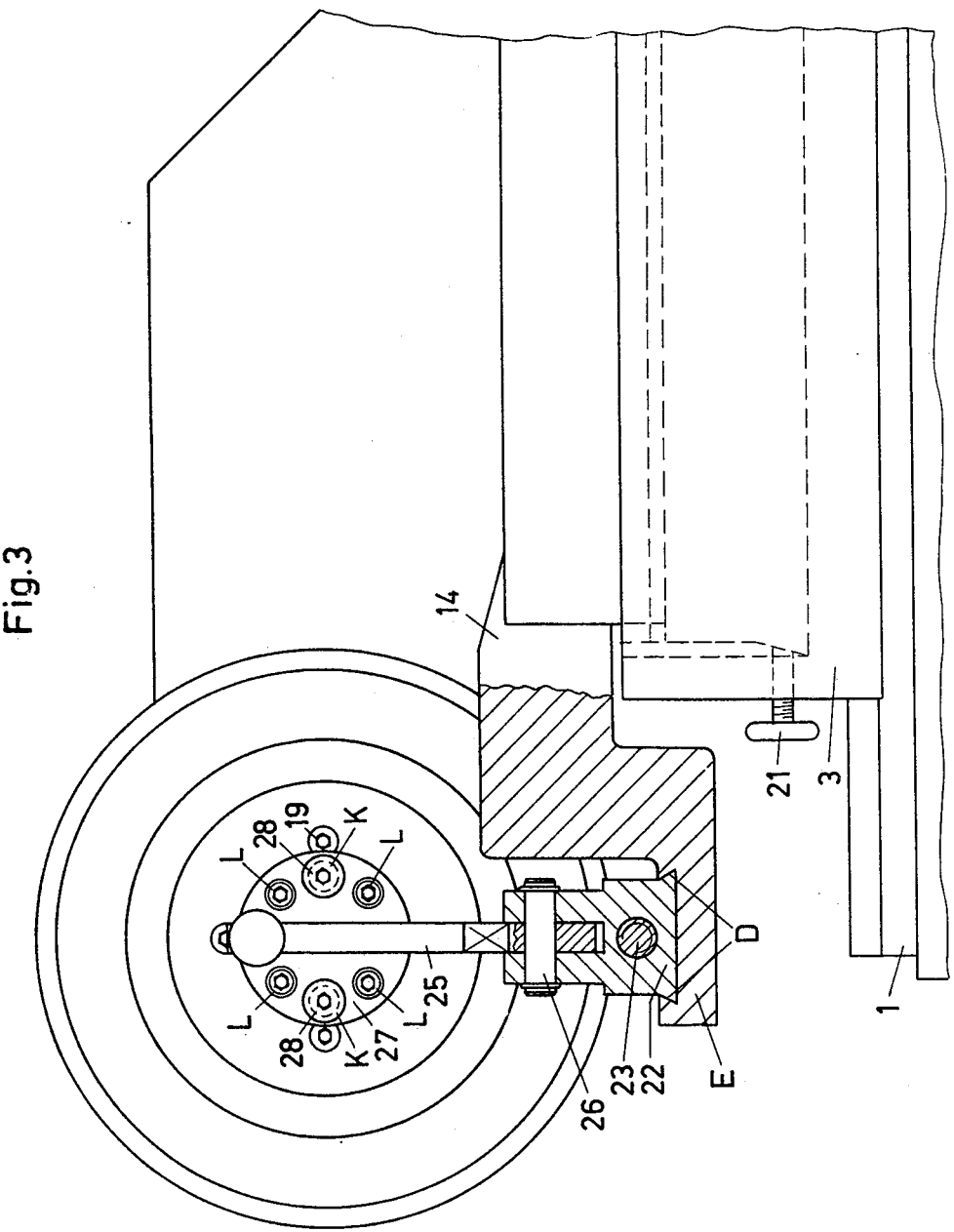
FIG. 3 is a view taken along line III—III of FIG. 2.
Figure 4:
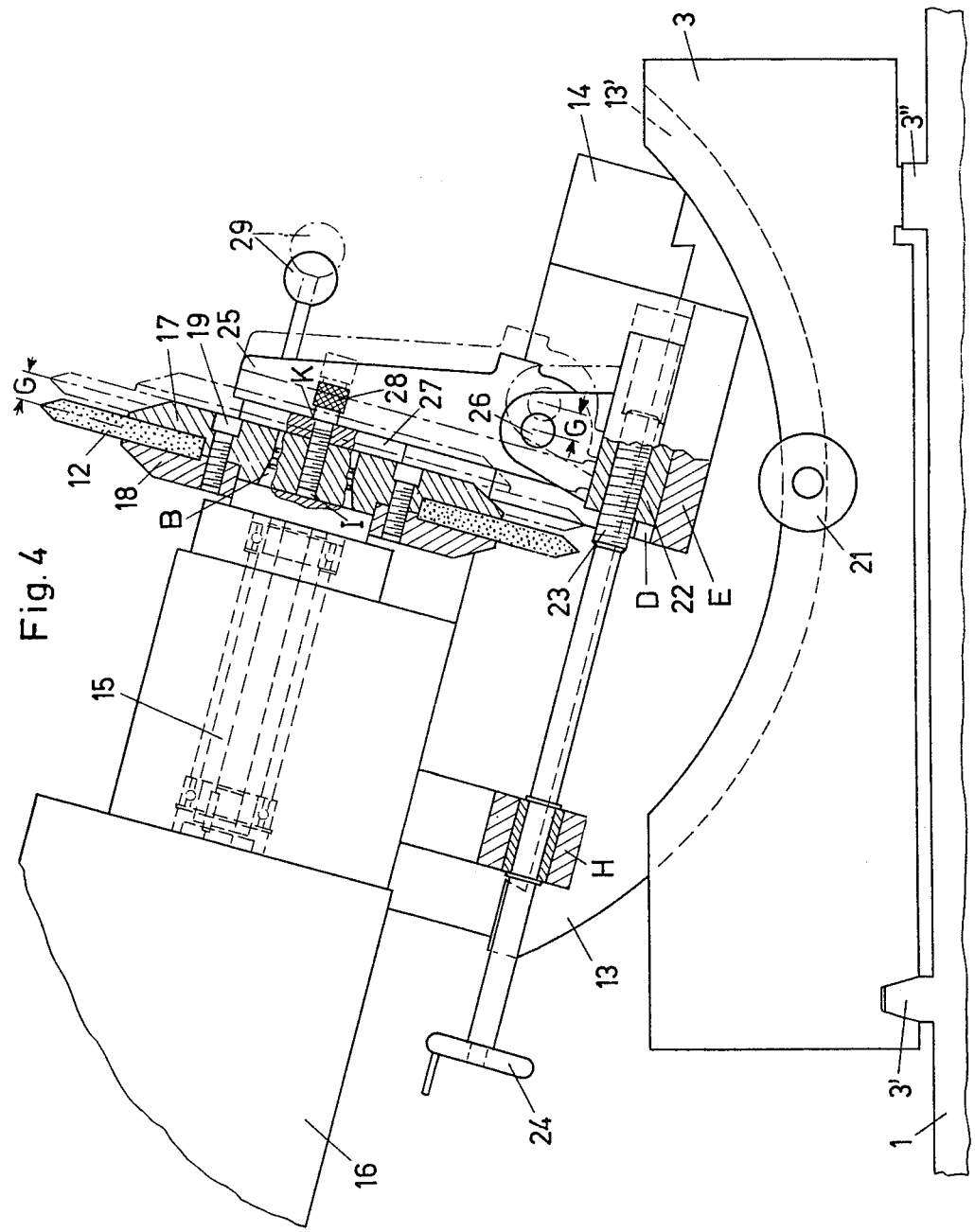
FIG. 4 is a view in elevation of the grinding disk changing device partially in section.

During the grinding operation of the thread-grinding machine, the carriage 22 is disposed in its position to the right as shown in FIGS. 2 and 4 in dash-dotted lines. The carrier 25, as shown in FIG. 2 in dash-dotted lines, is folded downwardly. If the grinding wheel assembly consisting of elements 12, 17 and 18 as mentioned above and fastened on the end B of the grinding spindle is to be removed, the carrier 25 is folded upward (See FIG. 4) whereby the axes of the grinding spindle or the grinding tool, respectively, coincides with the axis of the centering pin C. By rotating the threaded spindle 23, the carriage 22 and the carrier 25 connected therewith are moved through a distance G against the grinding tool until the plate 27 on the front surface of the flange body comes into place and the centering pin C projects into the mating bore F of the grinding wheel assembly. The parts are now in the position shown in dash-lines in FIGS. 2 and 4. The flange body 17 of the grinding tool is now fixed on the plate 27 with the two screws 28. Then the screws 20 are loosened through the passage holes L and removed.

By rotating the hand wheel 24, the carriage 25, and the grinding wheel assembly centered on the centering pins C are pushed away a distance G from the grinding spindle and thereupon brought into position shown in the dash-dotted lines in FIG. 4. Then the carrier 25 together with the grinding tool seated upon it is pivoted to the right to assume the position shown by the dot-dash lines in FIG. 2. In this position the grinding wheel assembly may easily be exchanged.

The delivery and fastening of another grinding tool on the end B of the grinding spindle 15 takes place in the reversed sequence.

By this device, it is possible to mount the grinding tool on the end B of the grinding spindle without any danger of damage to the fitting surfaces provided for the fastening of the grinding wheel assembly thereto. A great advantage, of course, lies in the saving of costs in that upon reusing grinding disks already adjusted, the latter do not need to be adjusted in view of the accurate rotation insured by the changing device.

What is claimed is:

1. In a grinding machine having a grinding spindle positioned in a grinding support and adapted to have a grinding wheel assembly connected thereto, the combination comprising:
    a sliding carriage slidably mounted on said grinding support;
    a grinding wheel carrier mounted on said sliding carriage for receiving thereon a grinding wheel assembly;
    a threaded spindle threadedly connected to said sliding carriage for slidably moving said sliding carriage and said grinding wheel carrier in a longitudinal direction parallel to the axis of the grinding spindle;
    pivotable mounting means supporting said grinding wheel carrier on said sliding carriage for selectively pivoting said grinding wheel carrier about an axis transverse to the grinding spindle between its operating and rest positions;
    whereby in the operating position of said grinding wheel carrier a grinding wheel assembly may be moved into position on the grinding spindle by manipulation of said threaded spindle connected to said sliding carriage;
    a plate member fastened to said carrier; and
    means defining openings in said plate member through which screws may be inserted into mating threaded openings in said grinding wheel assembly.

2. The apparatus of claim 1, including
    second opening defining means in said plate through which registering screws in the grinding wheel assembly may be withdrawn when the grinding wheel assembly is to be disassembled.

3. The apparatus of claim 2 including
    a centering pin on said support member of said carrier adapted to fit into a mating opening in the grinding wheel assembly.

4. A device on a grinding machine for mounting the grinding tool on the grinding spindle positioned in a grinding support and removing it from the same, wherein the device is connected with the grinding support and has a carrier which by means of a threaded spindle is slidably guided on a sliding carriage in longitudinal direction of the grinding spindle, and that the carrier is swingable downwardly by means of a rotating movement out of its operative position into its position of rest, or is swingable upwardly out of the position of rest into the operative position, respectively; and wherein a plate is arranged on the carrier, said plate having a centering pin as well as holes for screws for the connection of the grinding tool with the carrier and further holes for the release of the screw connecting the grinding tool with the grinding spindle and that the centering pin fits in a corresponding opening of the grinding tool.

* * * * *